Figure 5:
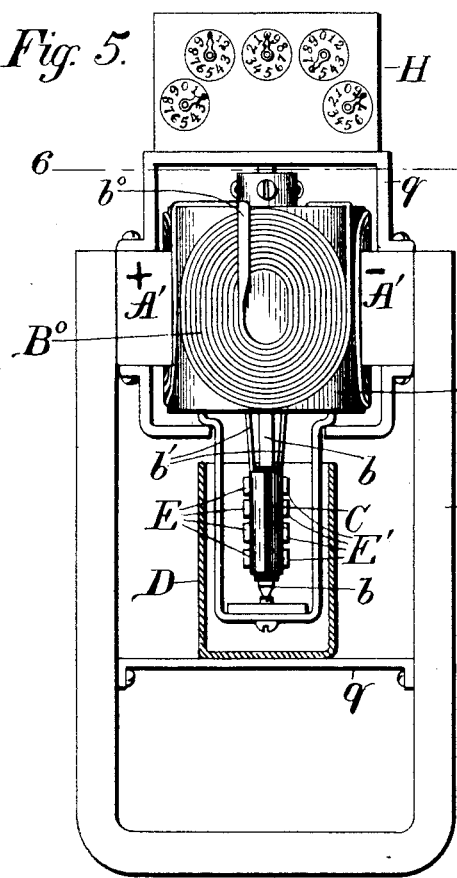

(No Model.) 2 Sheets—Sheet 1.
H. A. ROWLAND.
ELECTRIC METER.
No. 542,945. Patented July 16, 1895.
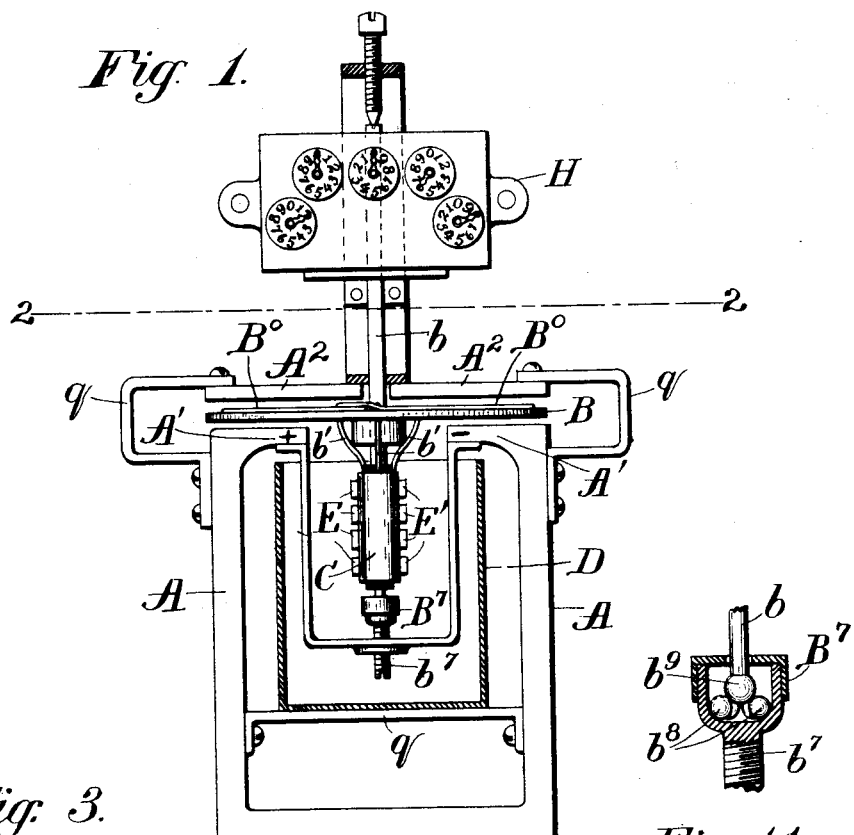
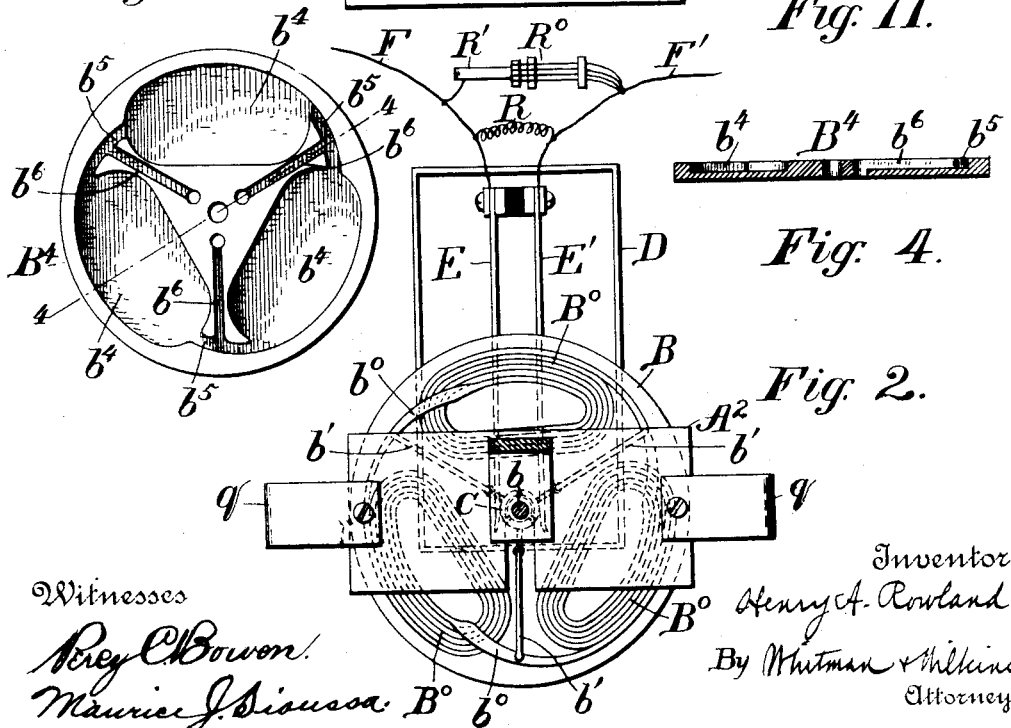
Witnesses
Percy C. Bowen
Maurice J. Sioussa
Inventor
Henry A. Rowland,
By Whitman & Wilkinson,
Attorneys.

(No Model.) 2 Sheets—Sheet 2.

H. A. ROWLAND.
ELECTRIC METER.

No. 542,945. Patented July 16, 1895.

Witnesses
Percy C. Bowen
Maurice J. Siousso,

Inventor
Henry A. Rowland
By Whitman & Wilkinson
Attorneys.

UNITED STATES PATENT OFFICE.

HENRY A. ROWLAND, OF BALTIMORE, MARYLAND, ASSIGNOR OF ONE-HALF TO LOUIS DUNCAN, OF SAME PLACE.

ELECTRIC METER.

SPECIFICATION forming part of Letters Patent No. 542,945, dated July 16, 1895.

Application filed April 19, 1895. Serial No. 546,377. (No model.)

*To all whom it may concern:*

Be it known that I, HENRY A. ROWLAND, a citizen of the United States, residing at Baltimore, in the State of Maryland, have invented certain new and useful Improvements in Electric Meters; and I do hereby declare the following to be a full, clear, and exact description of the invention, such as will enable others skilled in the art to which it appertains to make and use the same.

My invention relates to electric meters, and its object is to provide a simple and cheap apparatus for measuring the time integral of an electric current, which apparatus is ordinarily called "a current-meter."

This invention belongs to that class of meters known as "motor-meters," being in general a motor actuated by the current to be measured and working against a resistance proportional to the speed.

One of the herein-described improvements in such meters consists in supporting the coils of the meter by the same non-magnetic conductor which produces the damping effect by its revolution in the magnetic field. Moreover, this combination of a motor and conductor is not only eminently adapted for measuring an electric current, but it also has a remarkable degree of uniformity of speed, and is suitable for use wherever the said uniformity of speed is desirable—as, for instance, in clocks for driving astronomical telescopes, chronographs, and for a great variety of other uses which it will not be necessary to enumerate.

The invention also consists in placing a shunt across the terminals of the motor or between the commutator segments for the purpose of reducing sparking, of regulating and changing the constant of the meter, and for protecting it in case the brushes become displaced or worn.

The invention also includes introducing a device for correcting the motor for variations of the temperature.

It is further proposed to immerse the commutator in oil for the purpose of washing away the dirt, of keeping the contact good, and of lubricating the commutator to reduce friction.

While the broad idea of my invention is capable of a great variety of modifications it will be described with reference to two generic types, which will be understood by reference to the accompanying drawings, in which the same parts are indicated by the same letters throughout the several views.

Figure 7:
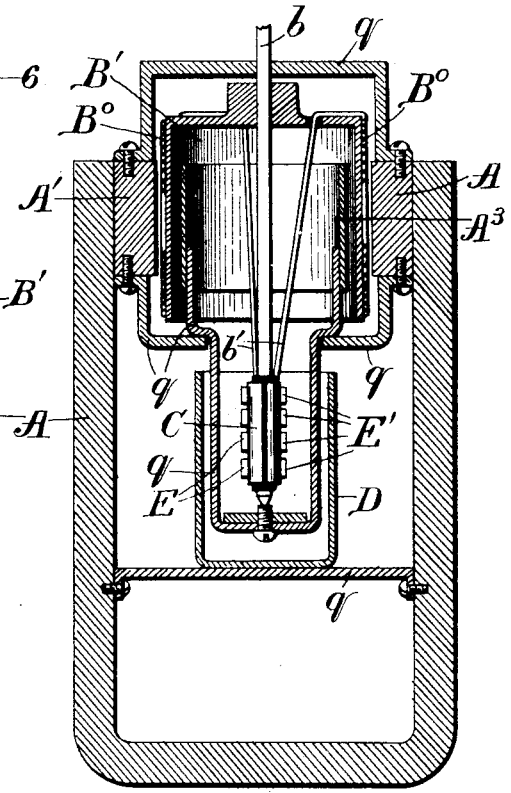
Figure 6:
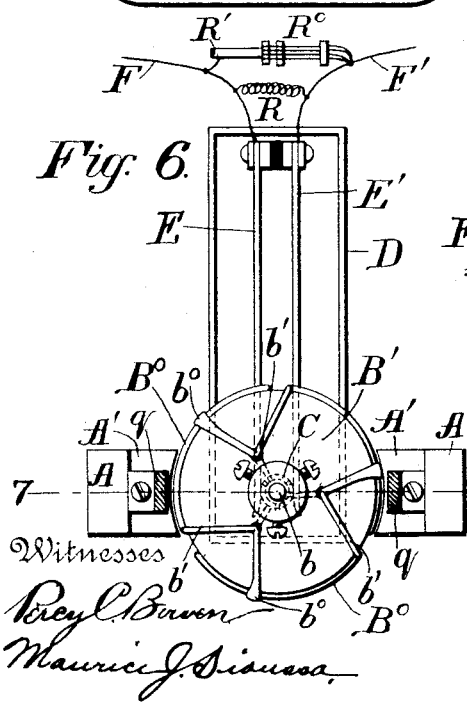
Figure 8:
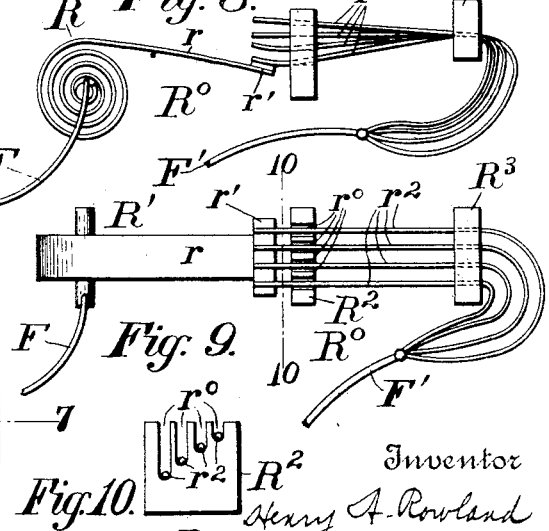
Figure 10:
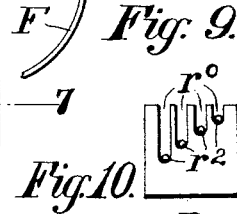
Figure 9:
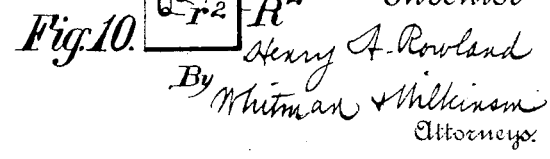

Figure 1 represents a disk-shaped plate made of non-magnetic conducting material, which disk carries the wires for conveying the current to be measured and rotates in a magnetic field. Fig. 2 represents a section along the line 2 2 of Fig. 1 and looking down. Fig. 3 represents a modified form of disk in which the wires are let into the conducting plate or disk. Fig. 4 represents a section along the line 4 4 of Fig. 3. Fig. 5 represents a side elevation, partly in section, in which the disk shown in Figs. 1 to 4 is replaced by an inverted cup-shaped vessel made of non-magnetic conducting material, on the surface of which the coils of wire carrying the current to be measured are mounted. Fig. 6 represents a section along the line 6 6 of Fig. 5 and looking down. Fig. 7 represents a vertical section along the line 7 7 of Fig. 6. Fig. 8 represents in side elevation, on an enlarged scale, the device for compensating for changes of temperature. Fig. 9 represents a plan view of the device shown in Fig. 8. Fig. 10 represents an end view of the resistance-wires adapted to be thrown in multiple circuit as the temperature rises, and Fig. 11 represents a detail view of a ball-bearing adapted for use in my invention.

A represents a magnet, preferably a permanent one, and having enlarged pole-pieces A' on one side of the revolving surface. On the other side of the revolving surface and in close proximity thereto is a soft-iron plate $A^2$, as shown in Figs. 1 and 2, or a soft-iron cylinder $A^3$, as shown in Fig. 7.

Referring especially to Figs. 1 and 2, the disk B, made of copper or other suitable non-magnetic conducting material, is mounted on the shaft $b$ and carries a plurality of coils, preferably three in number, $B^0$, which are wound as shown in Fig. 2 and are connected to the commutator C by conductors $b'$, connected midway between the said coils. In order to reduce the surface of the said coils exposed to the air and to enable the said disk, with the coils mounted thereon, to fit snugly between the parts A' and A², which excite the magnetic field, the wires are flattened, as at $b^0$; but the said disk may be provided with chambers or pockets, as shown in Figs. 3 and 4, wherein B⁴ represents the disk and $b^4$ the pockets, which may be of any desired form or shape and in which the wires may be laid so as not to project above the surface of the disk, while grooves $b^5$ and $b^6$ may be provided to receive the wires connecting the adjacent coils and also connecting the conductors between the said coils to the commutator. A cover may also be added to inclose the coils if so desired.

The lower end of the shaft $b$, which supports the armature, may be supported upon antifriction-bearings of any type, but preferably upon the ball-bearing shown in Fig. 11, in which B⁷ represents a case carried on the upper end of the adjusting-screw $b^7$, in which case are mounted a plurality of balls $b^8$, free to roll around in said case. On these balls the rounded end $b^9$ of the shaft $b$ is supported. This or any other suitable ball-bearing or antifriction-bearing may be used in the instrument.

The commutator C is preferably immersed in oil in a cup D, as shown in Figs. 1 and 2.

E and E' represent the brushes which connect the commutator with the wires F and F', connected to the source of electricity. Between these wires F and F' a fixed resistance R is inserted, which resistance should be regulated by the instrument-maker to suit the constant of the meter. A second adjustable resistance R⁰ is also placed between the wires, which resistance automatically regulates the meter for variations in temperature, as illustrated in Figs. 8 to 10. In these figures one of the wires F and F' is connected to a spiral spring R', which is preferably made of zinc and iron, which spring carries at its free end $r$ a conducting-strip $r'$, transversely disposed and adapted to pick up one or more of the free ends of the wires $r^2$, which wires project through grooves $r^0$ in the non-conducting support R², which grooves are arranged in a series of steps, as shown in Fig. 10, and the said strip $r'$ is adapted to make connection through one, two, or more of these wires, the other ends of which are connected to the opposite wire F'. Thus when the temperature is increased the spring R' will expand, throwing the resistance-wires $r^2$ in multiple and directing a larger proportion of the current through the shunt than when the temperature is low.

Since the meter will tend to go faster when the temperature is higher, due to the lower conductivity of the conducting revolving mass and the consequent diminished damping effect, the effect of lessening the resistance in the shunt will be to slow down the meter, and thus an exceedingly nice adjustment or regulation may be obtained.

The number of revolutions of the meter is indicated by the registering apparatus H, which may be of any well-known type.

In the form of device shown in Figs. 5 to 7 the flat disk B is replaced by an inverted cup B', of copper or like conducting nonmagnetic material, on the surface of which the coils B⁰ are wound, which coils are connected to each other and to the commutator, as has already been described with reference to Figs. 1 and 2. Inside of this inverted cup is a soft-iron cylinder A³, which combines with the pole-pieces A' to form a magnetic field, in which the cup is revolved. The connections of the various parts and the operation of the meter are precisely the same in either case.

The various parts of the framework used in supporting or journaling the fixed or revoluble parts are indicated by the letter $q$, and are made of brass or any other suitable nonmagnetic material. Three coils of wire are preferably used, as this is the least number that will, with proper shaped pole-pieces, cause a uniform torque with no dead-points; but any number greater than three may be used, if desired; also, the number of magnetic poles might be increased at will. Moreover, other modes of winding the wire might be adopted, the idea always being to use the metal conducting body as a support for the coils as well as to produce the resistance to the motion by the movement of the said conducting body in the magnetic field.

While the commutator should preferably be immersed in oil, glycerine, or other nonconducting liquids, the commutator may be run dry, if desired, or any suitable mechanical device for supplying oil may be used.

While I have shown a rotating disk and an inverted cup, any surface of revolution may be provided with an arrangement of coils, and the wires may be led therefrom to the commutator in any way that may be desired. As long as the armature-coils will not remain in position when the damping-conducting body is removed, so far the spirit of my invention extends. By thus giving to the damping-conductor the additional function of supporting the armature-coils the construction is very much simplified. There is also another advantage gained by making the conducting body and the coils revolve in the same magnetic field, and that is that the variations of the speed due to change of magnetism are only half as great as if the armature were outside that field.

By making the armature without iron a meter and also a motor are obtained having many desirable properties not possessed by those containing iron. In fact, a meter with iron in the armature is so affected by hysteresis that it is not reliable, and, indeed, is not a practical instrument.

The revolving surface herein described, taken in combination with the permanent magnets, constitutes a motor having a most remarkably uniform speed, and hence the said motor is eminently adapted for all purposes where a constant speed is desired, such as in astronomical clocks or other like apparatus, as well as in electric meters. These and the various other advantages of the herein described construction will readily suggest themselves to any one skilled in the art.

I claim as my invention—

1. In an electric motor, the combination with a magnetic field, of a non-magnetic conducting body revolubly mounted in said field, and a plurality of coils of wire mounted on said non-magnetic conducting body, substantially as described.

2. An armature for an electric motor consisting of a plurality of coils of wire mounted on a non-magnetic conducting body which body is adapted both to furnish a support for the wire winding, and to effect the retardation of its own motion, due to the currents induced therein, substantially as described.

3. In an electric motor, an armature consisting of a mass of conducting non-magnetic metal, formed into a surface of revolution, and supporting a plurality of coils of wire for carrying an electric current, the said mass serving not only as a support to the coils, but as a retarding influence due to the currents induced therein substantially as described.

4. In an electric meter, the combination with a magnetic field, of a non-magnetic conducting body revolubly mounted in said field, a plurality of coils of wire mounted on said non-magnetic conducting body, and a registering device actuated by said conducting body, substantially as described.

5. In an electric meter, the combination with an armature consisting of a non-magnetic conducting body supporting a plurality of coils of wire for carrying an electric current, the said body serving not only as a support to the coils, but as a retarding influence due to the currents induced therein; of a registering device operated by said armature, substantially as described.

6. In an electric meter, the combination with an armature consisting of a mass of conducting non-magnetic metal, formed into a surface of revolution, and supporting a plurality of coils for carrying an electric current, the said mass serving not only as a support to the coils, but as a retarding influence due to the currents induced therein; of a commutator connected to said coils, conducting wires and brushes for connecting the source of electricity to said commutator, and a shunt interposed between said conducting wires, substantially as described.

7. In an electric meter, the combination with an armature consisting of a mass of conducting non-magnetic metal, formed into a surface of revolution, and supporting a plurality of coils of wire for carrying an electric current, the said mass serving not only as a support to the coils, but as a retarding influence due to the currents induced therein; of a source of electricity, and conductors for carrying the same into and out of said armature, and a shunt with means for regulating the same inserted between said conductors, substantially as described.

8. In an electric motor the combination with a source of electricity, of an armature consisting of three coils of wire mounted on a non-magnetic conducting body which body is adapted both to furnish a support for the wire winding, and to effect the retardation of its own motion, due to the currents induced therein, and conductors connecting said armature with source of electricity, substantially as described.

9. In an electric motor, the combination with an armature consisting of a disk-shaped mass of conducting non-magnetic metal supporting a plurality of coils of wire for carrying an electric current, the said mass serving not only as a support to the coils, but as a retarding influence due to the currents induced therein, substantially as described.

10. In an electric meter, the combination with an armature consisting of a disk-shaped mass of conducting non-magnetic metal, and supporting a plurality of coils of wire for carrying an electric current, the said mass serving not only as a support to the coils, but as a retarding influence due to the currents induced therein; of a registering device operated by said armature, substantially as described.

11. In an electric motor, the combination of a source of electricity, an armature consisting of a disk with chambers in the face thereof, with coils of wire mounted in said chambers, which disk is adapted to furnish a support for the said coils and also to effect the retardation of its own motion, due to the currents induced therein, and conductors connecting said armature with said source of electricity, substantially as described.

12. In an electric motor, the combination of a source of electricity, an armature consisting of a non-magnetic conducting disk with chambers in the face thereof, with coils of wire mounted in said chambers, which disk is adapted to furnish a support for the said coils, and to effect the retardation of its own motion, due to the currents induced therein, conductors connecting said armature with said source of electricity, and a shunt interposed between said conductors, substantially as described.

13. In an electric meter, the combination with an armature consisting of a mass of conducting non-magnetic metal, supporting a plurality of coils for carrying an electric current, the said mass serving not only as a support to the coils, but as a retarding influence due to the currents induced therein; of a commutator connected to said coils, conducting wires and brushes for connecting the source of electricity to said commutator, and an automatically regulated shunt interposed between said conducting wires, substantially as described.

14. In an electric meter, the combination with an armature consisting of a mass of conducting non-magnetic metal, supporting a plurality of coils of wire for carrying an electric current, the said mass serving not only as a support to the coils, but as a retarding influence due to the currents induced therein; of a source of electricity, and conductors for carrying the same into and out of said armature, and a fixed shunt and an automatically adjustable shunt inserted between said conductors, substantially as described.

In testimony whereof I affix my signature in presence of two witnesses.

HENRY A. ROWLAND.

Witnesses:
PERCY C. BOWEN,
JOHN C. WILSON.